United States Patent
Bourgeois

(10) Patent No.: US 11,148,400 B2
(45) Date of Patent: Oct. 19, 2021

(54) THERMALLY LAMINATED TAB LINER

(71) Applicant: Tekni-Plex, Inc., Wayne, PA (US)

(72) Inventor: Philip D. Bourgeois, Perrysburg, OH (US)

(73) Assignee: Tekni-Plex, Inc., Wayne, PA (US)

( * ) Notice: Subject to any disclaimer, the term of this patent is extended or adjusted under 35 U.S.C. 154(b) by 1084 days.

(21) Appl. No.: 15/091,607

(22) Filed: Apr. 6, 2016

(65) Prior Publication Data

US 2017/0291399 A1 Oct. 12, 2017

(51) Int. Cl.
*B32B 7/06* (2019.01)
*B32B 27/08* (2006.01)
(Continued)

(52) U.S. Cl.
CPC .............. *B32B 27/08* (2013.01); *B29C 65/18* (2013.01); *B29C 65/368* (2013.01); *B29C 65/3656* (2013.01); *B29C 65/7461* (2013.01); *B29C 65/76* (2013.01); *B29C 66/004* (2013.01); *B29C 66/112* (2013.01); *B29C 66/114* (2013.01); *B29C 66/1122* (2013.01); *B29C 66/24221* (2013.01); *B29C 66/43* (2013.01); *B29C 66/433* (2013.01); *B29C 66/45* (2013.01); *B29C 66/53461* (2013.01); *B29C 66/71* (2013.01); *B29C 66/723* (2013.01); *B29C 66/72321* (2013.01); *B29C 66/7392* (2013.01); *B29C 66/73921* (2013.01); *B29C 66/8322* (2013.01); *B29C 66/83413* (2013.01); *B32B 3/02* (2013.01); *B32B 3/28* (2013.01); *B32B 7/05* (2019.01); *B32B 7/10* (2013.01); *B32B 15/04* (2013.01); *B32B 15/082* (2013.01); *B32B 15/085* (2013.01); *B32B 15/20* (2013.01); *B32B 27/306* (2013.01); *B32B 27/308* (2013.01); *B32B 27/32* (2013.01); *B32B 27/34* (2013.01); *B32B 27/36* (2013.01); *B32B 37/06* (2013.01); *B65D 51/185* (2013.01); *B65D 51/20* (2013.01);
(Continued)

(58) Field of Classification Search
None
See application file for complete search history.

(56) References Cited

U.S. PATENT DOCUMENTS 2,937,481 A 5/1960 Palmer
4,224,379 A 9/1980 Ichinose et al.
(Continued)

OTHER PUBLICATIONS

Int'l. Search Report and Written Opinion dated Jun. 21, 2017 in corresponding Int'l. Appln. No. PCT/US2017/024774.

*Primary Examiner* — Scott R. Walshon
*Assistant Examiner* — Thomas A Mangohig
(74) *Attorney, Agent, or Firm* — Polsinelli, P.C.

(57) ABSTRACT

Liner having an induction heat sealable layer for sealing to a rim of a container, and a pull tab for ease of removal of the liner from the container rim. A folded insert disposed between multilayer upper and lower components, has a heat bondable polyolefin layer that is thermally laminated to polyolefin layers of the upper and lower components, forming a pull tab between the integrated polyolefin layers. The resulting composite resists delamination and can be formed in a single thermal lamination step, avoiding the multiple lamination steps, associated high equipment costs, and complex layer constructions of the prior art.

12 Claims, 6 Drawing Sheets

(51) Int. Cl.

| | | |
|---|---|---|
| *B32B 15/20* | (2006.01) | |
| *B32B 7/10* | (2006.01) | |
| *B65D 65/40* | (2006.01) | |
| *B32B 15/082* | (2006.01) | |
| *B32B 27/34* | (2006.01) | |
| *B32B 27/36* | (2006.01) | |
| *B32B 15/04* | (2006.01) | |
| *B32B 15/085* | (2006.01) | |
| *B65D 51/18* | (2006.01) | |
| *B32B 3/02* | (2006.01) | |
| *B65D 77/20* | (2006.01) | |
| *B65D 51/20* | (2006.01) | |
| *B29C 65/74* | (2006.01) | |
| *B29C 65/36* | (2006.01) | |
| *B29C 65/00* | (2006.01) | |
| *B29C 65/76* | (2006.01) | |
| *B32B 7/05* | (2019.01) | |
| *B29C 65/18* | (2006.01) | |
| *B32B 3/28* | (2006.01) | |
| *B32B 27/30* | (2006.01) | |
| *B32B 27/32* | (2006.01) | |
| *B32B 37/06* | (2006.01) | |
| *B32B 37/04* | (2006.01) | |
| *B32B 37/00* | (2006.01) | |
| *B29L 31/00* | (2006.01) | |
| *B29K 705/02* | (2006.01) | |
| *B29L 31/56* | (2006.01) | |

(52) U.S. Cl.
CPC ......... B65D 65/40 (2013.01); B65D 77/2024 (2013.01); *B29C 66/7352* (2013.01); *B29C 66/73713* (2013.01); *B29C 2793/009* (2013.01); *B29C 2793/0018* (2013.01); *B29C 2793/0081* (2013.01); *B29K 2705/02* (2013.01); *B29L 2031/565* (2013.01); *B29L 2031/712* (2013.01); *B32B 37/0053* (2013.01); *B32B 37/04* (2013.01); *B32B 2250/24* (2013.01); *B32B 2250/44* (2013.01); *B32B 2255/06* (2013.01); *B32B 2255/26* (2013.01); *B32B 2270/00* (2013.01); *B32B 2305/34* (2013.01); *B32B 2307/31* (2013.01); *B32B 2307/518* (2013.01); *B32B 2323/04* (2013.01); *B32B 2323/10* (2013.01); *B32B 2331/04* (2013.01); *B32B 2435/02* (2013.01); *B32B 2581/00* (2013.01)

(56) References Cited

U.S. PATENT DOCUMENTS

| | | |
|---|---|---|
| 4,960,216 A | 10/1990 | Giles et al. |
| 4,961,986 A | 10/1990 | Galda et al. |
| 5,217,790 A | 6/1993 | Galda et al. |
| 5,231,990 A | 11/1993 | Galda et al. |
| 5,402,015 A | 3/1995 | Hammermann |
| 5,433,992 A | 7/1995 | Galda et al. |
| 5,514,442 A | 5/1996 | Galda et al. |
| 5,679,201 A | 10/1997 | Gardiner |
| 5,702,015 A | 12/1997 | Giles et al. |
| 6,082,566 A | 7/2000 | Yousif et al. |
| 6,312,776 B1 | 11/2001 | Finkelstein et al. |
| 6,378,715 B1 | 4/2002 | Finkelstein et al. |
| 6,461,714 B1 | 10/2002 | Giles |
| 6,886,926 B2 | 5/2005 | Kaga et al. |
| 6,902,075 B2 | 6/2005 | O'Brien et al. |
| 7,217,454 B2 | 5/2007 | Smelko et al. |
| 7,419,559 B2 | 9/2008 | Giles |
| 7,648,764 B2 | 1/2010 | Yousif |
| 8,080,118 B2 | 12/2011 | Yousif |
| 8,329,288 B2 | 12/2012 | Allegaert et al. |
| 8,348,082 B2 | 1/2013 | Cain |
| 8,404,352 B2 | 3/2013 | Schwab et al. |
| 2004/0071934 A1 | 4/2004 | Giles |
| 2006/0151541 A1 | 7/2006 | Smelko et al. |
| 2008/0286576 A1 | 11/2008 | McGuire, Jr. |
| 2009/0078671 A1 | 3/2009 | Triquet et al. |
| 2009/0117354 A1* | 5/2009 | Miura ............... B32B 27/10 428/211.1 |
| 2011/0100989 A1 | 5/2011 | Cain |
| 2012/0028016 A1 | 2/2012 | Zuercher et al. |
| 2015/0197385 A1 | 7/2015 | Wei |
| 2018/0079576 A1† | 3/2018 | Cassidy |

\* cited by examiner
† cited by third party

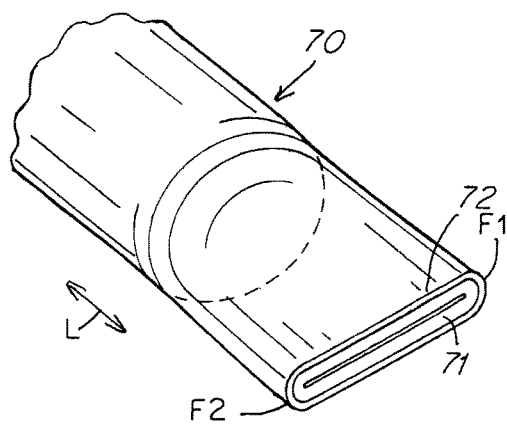 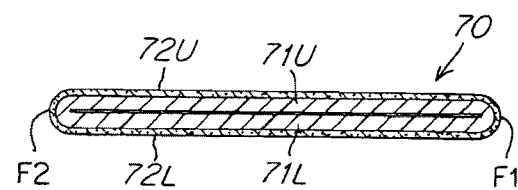
Fig. 8A  Fig. 8B
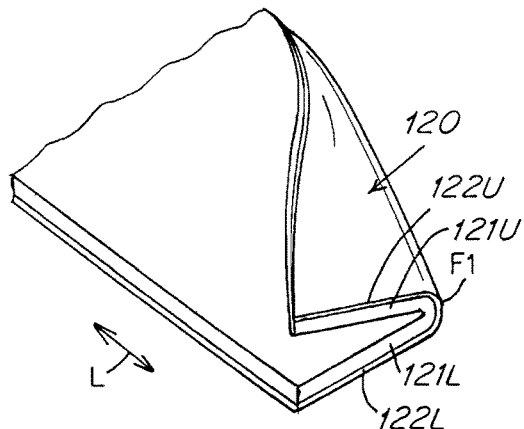 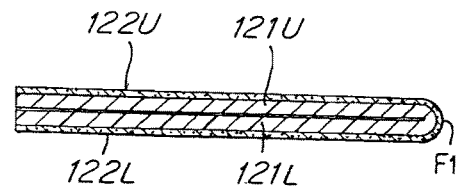
Fig. 9A  Fig. 9B
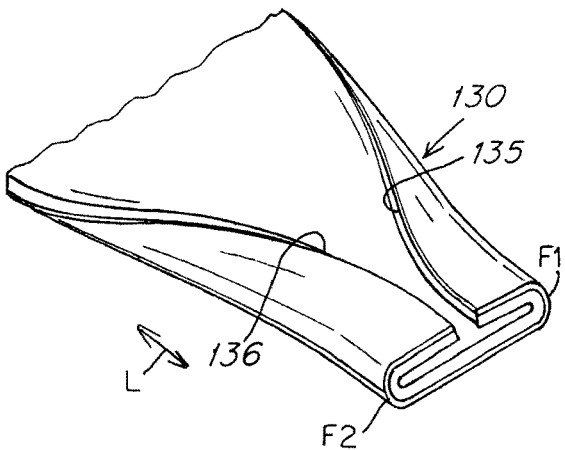 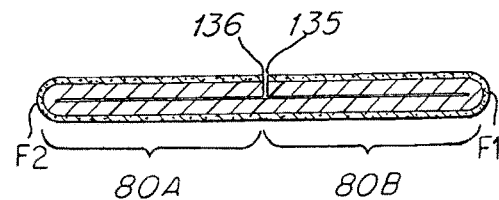
Fig. 10A  Fig. 10B

THERMALLY LAMINATED TAB LINER

FIELD OF THE INVENTION

The present invention relates to an induction heat-sealable liner for sealing to a rim of a container and to a method of its fabrication.

BACKGROUND OF THE INVENTION

Heat-sealable liners are induction heat sealed to the entire periphery of the rim of a container (also referred to as a neck finish or container mouth), thereby isolating the container contents from the exterior environment. There are two general methods of applying a heat seal liner, depending on whether it is applied alone (a one element liner) or in combination with a backing liner (a two element liner). To apply a one element liner, the liner is punched from a sheet of heat seal liner material, inserted into a closure, the closure is screwed onto the neck of a (previously filled) container, and the closure is then passed under a heat sealer that bonds (via induction heating) the liner to the rim of the container. For a two element liner, the combined liner is punched from a sheet of material that combines both the heat seal liner and backing liner layers, inserted into a closure, the closure is screwed onto the container, and the closure is passed under a heat sealer that both induction heat seals the heat-sealable liner to the rim and melts a layer (e.g., wax) between the heat seal liner and backing liner so that when the user removes the closure, the backing liner remains in the closure.

In various embodiments, the role of a heat-sealable liner is to render the container tamper proof, as well as provide a barrier between the contents and the exterior environment, e.g., for protecting drugs, medicine, or food packaged in the container. The secondary backing liner, which remains in the cap, provides a secondary tightness (barrier to the exterior) insofar as the heat seal liner has been partly or fully removed.

One type of heat-sealable liner includes a pull tab to facilitate removal of the liner from the mouth of the container. Generally, providing a pull tab greatly increases the complexity of the liner construction and its manufacturing process and cost. Some designs require use of a release coating to enable separation of a layer that becomes the tab. There are typically multiple lamination steps, and associated equipment required, resulting in high capital and manufacturing costs. In many cases, the tab acts as a point of failure, e.g., the tab ruptures or disconnects from the remaining liner portions before rupture of the induction heat seal bond with the mouth of the container.

It would thus be desirable to provide a simplified heat seal liner construction that can be more easily and inexpensively manufactured, while also providing the necessary barrier functionality and strength, e.g., to resist delamination of the liner or rupture of the pull tab while separating the liner from the mouth of the container.

SUMMARY OF THE INVENTION

Liner having an induction heat sealable layer for sealing to a rim of a container, and a pull tab for ease of removal of the liner from the container rim. A folded insert disposed between multilayer upper and lower components, has a heat bondable polyolefin layer that is thermally laminated to polyolefin layers of the upper and lower components, forming the integrated polyolefin layers and a pull tab. The resulting composite resists delamination and can be formed in a single thermal lamination step, avoiding the multiple lamination steps, associated high equipment costs, and complex layer constructions of the prior art.

In accordance with various embodiments of the invention, the liner has a three part construction, formed from an upper multilayer component, a lower multilayer component, and a multi-layer folded insert disposed in one area between the upper and lower components. In a first area of the liner the upper and lower components are thermally laminated together without the folded insert therebetween, forming a first non-separable liner portion. In contrast, the folded insert is disposed between a second area of the upper and lower components to form a second liner portion that includes a pull tab.

The materials and construction of the various liner components, namely the upper component, lower component, and folded insert, have been simplified for ease of manufacture. The liner includes a pull tab that resists delamination from the remainder of the liner when a user, grasping the pull tab, pulls the tab (and integral liner) away from the rim of the container in order to rupture the induction heat seal bond between the liner and the rim. The various liner materials permit thermal lamination between the upper and lower components, and between the upper component, the folded insert, and lower component, in the second and first liner portions respectively, by the application of heat and pressure, without bonding the inner separable layer of the folded insert so as to form the pull tab. The pull tab, extending via a hinged fold line from an upwardly facing side of the liner (opposite the downwardly facing side that bonds to the rim), similarly resists thermal bonding during the induction heat sealing process for applying the liner to the container rim.

In accordance with one embodiment of the invention there is provided a liner comprising:

three stacked multilayer components thermally laminated together to form a composite liner, the liner having an induction heat sealable lower layer for sealing to a rim of a container and a pull tab for ease of removal of the liner from the rim of the container, the three multilayer components comprising:

an upper multilayer component (UMC) comprising an upper support layer and a lower heat bondable polyolefin layer; and a lower multilayer component (LMC) comprising an upper heat bondable polyolefin layer, the lower induction heat sealable layer, and an inductive heating layer therebetween;

a folded insert comprising upper and lower multilayer insert portions joined at a fold line, each insert portion comprising an outer heat bondable polyolefin layer and an inner heat resistant separable layer wherein in a folded position the inner separable layers of the insert portions are facing one another and resist bonding by thermal lamination and induction heating to form the pull tab in the liner, the liner being formed by a method comprising:

in a first area of the liner the UMC and LMC polyolefin layers are disposed facing one another and are thermally laminated by application of heat and pressure to form an integral polyolefin layer of a non-separable first liner portion; and in a second area of the liner the polyolefin layers of the upper and lower insert portions are disposed facing the UMC and LMC polyolefin layers respectively and thermally laminated, by application of heat and pressure, to form integral polyolefin layers in a second liner portion having the pull tab.

In such an embodiment, the folded insert is formed from a multilayer tube or sheet comprising the heat bondable polyolefin layer and the heat resistant separable layer, the folded insert formed by a method comprising:

radially collapsing the tube or folding the sheet to form the fold line and insert portions on opposite sides of the fold line.

In such an embodiment, the liner has a substantially circular perimeter and the fold line intersects and extends across the circular perimeter at a length equal to or less than a diameter of the circular perimeter.

In such an embodiment, the support layer is formed from one or more of polyethylene terephthalate, polyamide, polyethylene naphthalate, polypropylene, or any combination thereof.

In such an embodiment, the folded insert is formed from a multilayer tube, the tube having an outer tube layer comprising the outer polyolefin layer of the insert, and the tube having an inner layer comprising the separable layer of the insert, the tube being collapsed to form the fold line and cut to form a folded tube portion that comprises the folded insert.

In such an embodiment the liner is punched from a thermally laminated web of the three multilayer components.

In such an embodiment the polyolefin layers of the liner are thermally laminated by at least partially melting the adjacent polyolefin layers.

In such an embodiment the polyolefin layers of the liner are formed from at least one of an ethylene-based polymer and a propylene-based polymer.

In such an embodiment the ethylene-based polymer is an ethylene-alpha olefin copolymer and the propylene-based polymer is a propylene-alpha olefin copolymer.

In such an embodiment the polyolefin layers of the liner are formed from at least one of ethylene vinyl acetate (EVA) based polymers, ethylene-methyl acrylate (EMA) based polymers, and ethylene-ethyl acrylate (EEA) based polymers.

In such an embodiment the polyolefin layers of the liner comprise polypropylene, polyethylene, and copolymers and blends thereof.

In such an embodiment the inductive heating layer comprises a metal foil layer.

In such an embodiment the multiplayer components are formed by one or more of extrusion, coextrusion, extrusion coating, extrusion lamination, and dry bond lamination.

In accordance with one embodiment of the invention there is provided a method of forming a liner comprising:
thermally laminating together three stacked multi-layer components to form a composite liner, the liner having an induction heat sealable lower layer for sealing to a rim of a container and a pull tab for ease of removal of the liner from the rim of the container, the three multi-layer components comprising:
  an upper multilayer component (UMC) comprising an upper support layer and a lower heat bondable polyolefin layer; and
  a lower multilayer component (LMC) comprising an upper heat bondable polyolefin layer, the lower induction heat sealable layer, and an inductive heating layer therebetween;
  a folded polymer insert comprising upper and lower multilayer insert portions joined at a fold line, each insert portion comprising an outer heat bondable polyolefin layer and an inner heat resistant separable layer wherein in a folded position the inner separable layers of the two insert portions are facing one another and resist bonding by thermal lamination and induction heating to form the pull tab in the liner,
wherein the method includes:
  disposing a first area of the UMC and LMC polyolefin layers facing one another,
  disposing the folded insert between a second area of the UMC and LMC polyolefin layers with the polyolefin layers of the upper and lower insert portions disposed facing the UMC and LMC polyolefin layers respectively, and
  forming a non-separable first liner portion by thermally laminating the facing polyolefin layers in the first area by application of heat and pressure to form an integral polyolefin layer, and
  forming a second liner portion having the pull tab by thermally laminating the facing polyolefin layers in the second area by application of heat and pressure to form integral polyolefin layers in the second liner portion.

In such an embodiment the polyolefin layers of the liner are formed from at least one of an ethylene-based polymer and a propylene-based polymer.

In such an embodiment the ethylene-based polymer is an ethylene-alpha olefin copolymer and the propylene-based polymer is a propylene-alpha olefin copolymer.

In such an embodiment the polyolefin layers are formed from at least one of ethylene vinyl acetate (EVA) based polymers, ethylene-methyl acrylate (EMA) based polymers, and ethylene-ethyl acrylate (EEA) based polymers.

In such an embodiment the polyolefin layers comprise polypropylene, polyethylene, and copolymers and blends thereof.

In such an embodiment the folded insert is formed from a multilayer tube or sheet comprising the heat bondable polyolefin layer and the heat resistant separable layer, the folded insert formed by a method comprising:
radially collapsing the tube or folding the sheet to form the fold line and insert portions on opposite sides of the fold line.

In such an embodiment the multilayer components are formed by one or more of extrusion, coextrusion, extrusion coating, extrusion lamination, and dry bond lamination.

In such an embodiment the method comprises:
providing the stacked three multilayer components; and forming the integral polyolefin layers in a single thermal laminating step.

In such an embodiment the UMC is formed, prior to the thermal laminating step, by one or more of extrusion, coextrusion, extrusion coating, extrusion lamination, and dry bond lamination.

In such an embodiment the LMC is formed, prior to the thermal laminating step, by one or more of extrusion, coextrusion, extrusion coating, extrusion lamination, and dry bond lamination.

In such an embodiment the folded insert is formed from a multilayer tube or sheet comprising the heat bondable polyolefin layer and the heat resistant separable layer, the folded insert formed by a method comprising:
radially collapsing the tube or folding the sheet to form the fold line and insert portions on opposite sides of the fold line.

In such an embodiment the polyolefin layers of the UMC, folded polymer insert and are partially melted while pressing between rollers to form the integral polyolefin layers of the liner.

In such an embodiment at least one of the rollers is heated.

BRIEF DESCRIPTION OF THE DRAWINGS

FIG. 8A is a schematic perspective view of an alternative embodiment for making a folded insert from a coextruded two-layer tube that is collapsed in the radial (thickness) direction (similar to that shown in FIGS. 1-7).

FIG. 8B is a cross-sectional view of the collapsed portion of the tube of FIG. 8A.

FIG. 9A is a schematic perspective view of another alternate embodiment of a folded insert made from a two-layer strip that is folded in half in the width direction to form a folded insert having one fold line.

FIG. 9B is a cross-sectional view of the folded two layer strip of FIG. 9A.

FIG. 10A is a schematic perspective view of an alternate embodiment of a folded insert wherein two opposing edges (ends) of the strip are folded inwardly toward one another to form two fold lines, one at each end of the double folded insert.

FIG. 10B is a cross-sectional view of the folded insert of FIG. 10A.

FIG. 12 is a cross sectional view of the three-layer component of FIGS. 1-7; FIG. 13 is a cross sectional view of a four layer component having an additional PET layer; FIG. 14 is a cross sectional view of an alternative three layer component having a top layer of foam rather than a solid polymer layer; and FIG. 15 is a cross sectional view of an alternative four layer component having both the foam and PET layers.

DETAILED DESCRIPTION OF THE INVENTION

Figure 1:
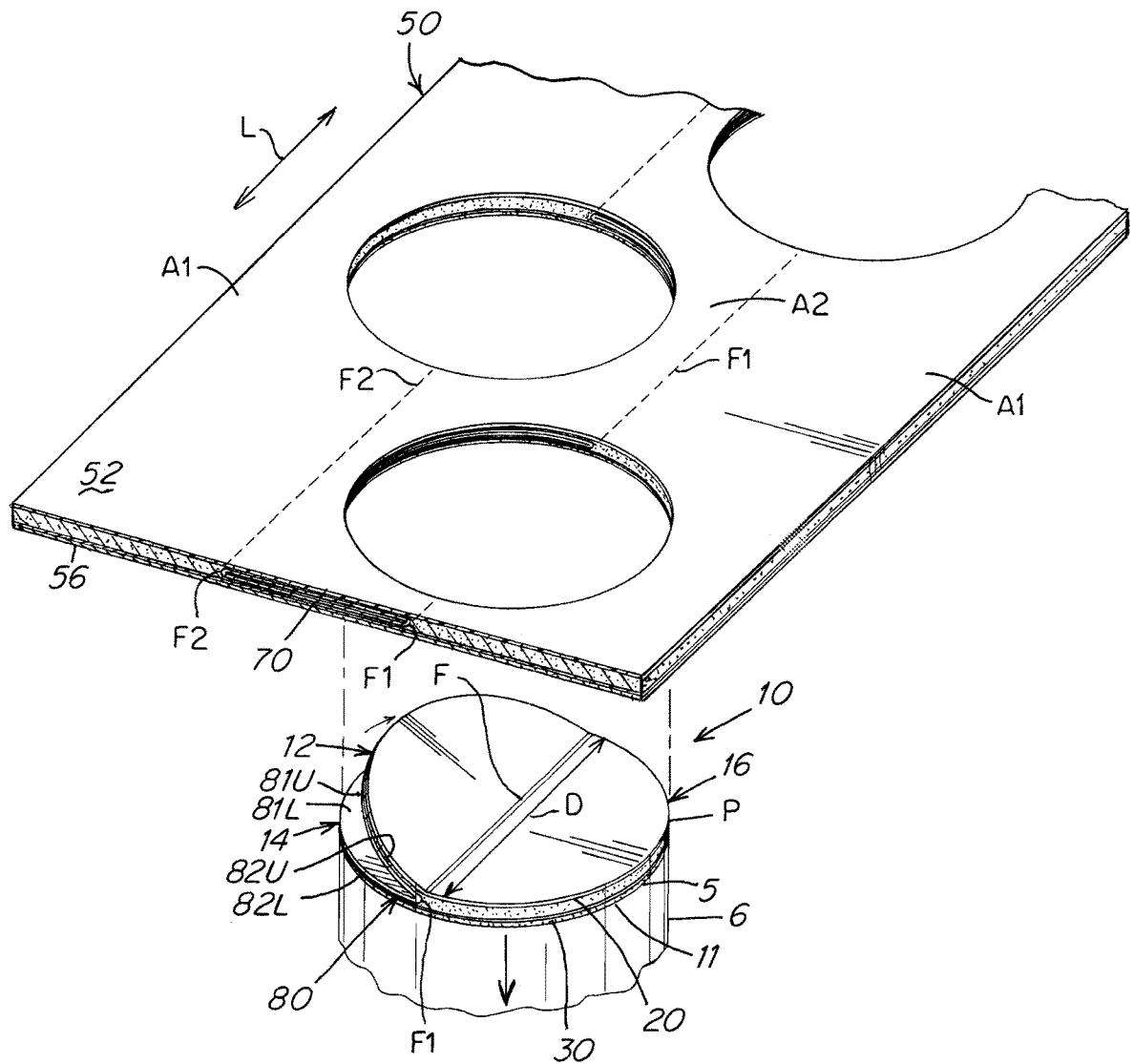
FIG. 1 is a schematic view, according to one embodiment of the invention, of a thermally laminated multilayer web from which multiple induction heat-sealable liner disks are punched, showing one such punched liner disk applied to the rim of a container, and with the pull tab extending (via a hinged fold line) from an upper side of the liner.

Various embodiments of the invention will now be described with regard to the accompanying figures. These examples are nonlimiting and meant to illustrate various embodiments of the liner configuration, materials, and manufacturing processes.

An induction heat-sealable liner, also referred to as a sealing disk, is provided which includes a hinged tab. The liner has a three layer stacked construction, including a multi-layer upper component, a multi-layer lower component, and disposed between one area of the upper and lower components, a folded insert for forming the hinged tab.

In various embodiments, the liner includes a lowermost induction heat-sealable layer, an inductive heating layer (e.g., a metal film layer that heats resistively during the induction heat sealing operation) above the lowermost heat-sealable layer, and one or more layers of reinforcing (support) materials for enhancing the mechanical strength of the liner (e.g., enabling the liner to be punched, inserted into a closure, pushed down over the mouth of the container by the closure (e.g. screw cap), induction heat sealed to the container rim, and subsequently pulled from the container rim without rupturing).

As used herein, a layer or sheet of inductive heating material is any material which heats resistively when it conveys an induced electrical current. Typically the inductive heating layer is a metal foil layer, such as aluminum foil.

The induction heat sealable (lowermost) layer can be made from any polymeric material that will soften and seal to the rim of a container, while allowing the heat seal bond to be later ruptured by a user (person) grasping the pull tab and pulling the liner away from the container rim. The heat sealable layer is typically made from a material selected from the group comprising polyethylene, polypropylene and copolymers and blends thereof; such materials may be copolymers with ethylene such as with vinyl acetate, methyl acrylate, ethyl acrylate, or with a variety of alpha olefins such as butene, hexane, or octane. The inductive heating layer and the heat sealable layer may be joined by means of a binder (e.g., a two component isocyanate-hydroxyl adhesive). In another embodiment, the inductive heating layer may be coated with a heat sealable material.

In various embodiments the liner includes multiple (initially separate) layers of polyolefin material that when brought into engagement during the thermal lamination process, i.e., the application of heat and pressure, will be softened or partially melted so as to form an integral polyolefin layer. The polyolefin may be one or more of polyethylene, polypropylene, polyethylene vinyl acetate (EVA), polyethylene-methyl acrylate (EMA), and polyethylene-ethyl acrylate (EEA). The polyolefin material may comprise a single polymer, a copolymer, or blend. Preferably the polyolefin layers are formed from at least one of an ethylene-based polymer and a propylene-based polymer. The ethylene-based polymer may be an ethylene-alpha olefin copolymer, and the propylene-based polymer may be a propylene-alpha olefin copolymer.

Additional layers of the liner may include a reinforcing layer, such as a bi-axially oriented polyester film having a thickness of between 4 and 100 micrometers. The overall liner thickness may typically range between 100 and 600 micrometers.

As used herein, thermal lamination means the application of heat and pressure in order to thermally bond adjacent polyolefin layers to form a composite liner construction, including the hinged pull tab, that resists delamination in use during the removal of the liner from the container finish. The heat and pressure may be applied for example, by feeding the various layers jointly between rotating rollers, wherein one or more of the rollers may be heated. Other methods are known for applying heat and pressure to accomplish thermal lamination, and the invention is not limited to a particular method of thermal lamination. As used herein, the starting multi-layer components may be formed by lamination, coextrusion, extrusion coating, dry bond lamination (which may include water, solvent, or solvent less adhesive), or any of various methods know in the art for forming multi-layer sheet materials.

Various examples of the invention will now be described.

FIGS. 1-7 show one method of forming a liner utilizing a collapsed multilayer tube to form the folded insert. In other embodiments, the folded insert is formed by folding a multi-layer sheet material, without use of a multi-layer tube.

FIG. 1 shows an induction heat sealable liner 10 in the form of a circular disk (having a circular perimeter P) that has been punched (with a circular die not shown) from a sheet or web 50 of laminated construction. The liner 10 has a lowermost surface layer 11 that can be heat sealed to a rim 5 of a container neck 6, by induction heat sealing.

Figure 2:
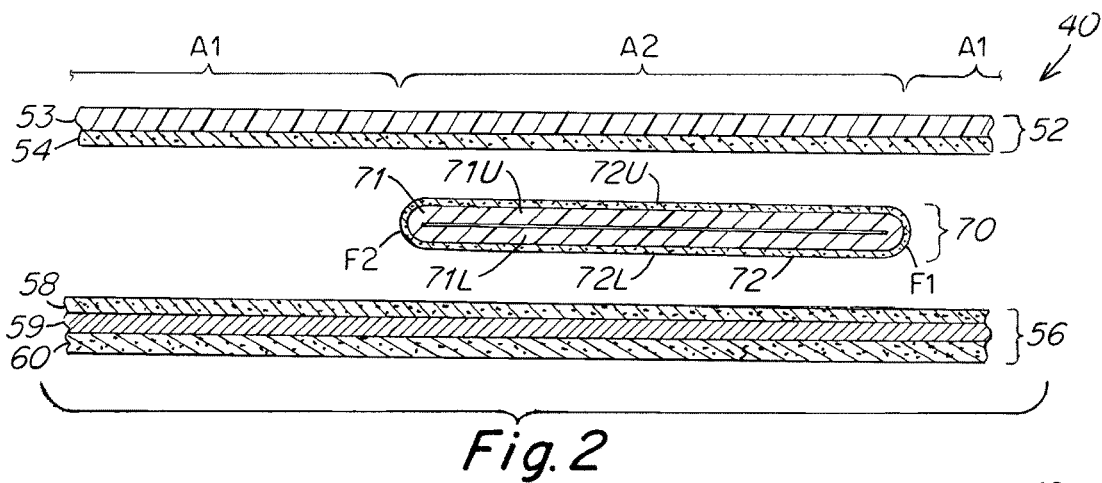
FIG. 2 is an exploded cross sectional view of three multi-layer components used to make the laminated web of FIG. 1, namely a radially collapsed coextruded tube (for forming the multi-layer folded insert) positioned between a multi-layer upper component and a multi-layer lower component; the collapsed coextruded tube is subsequently cut (punched) transversely through the collapsed tube thickness to form a liner, including a folded position of the collapsed tube that forms the pull tab.

The laminated web 50 includes at least one strip, here a collapsed coextruded tube 70, aligned in the lengthwise direction, that will form the multilayer folded insert. The collapsed coextruded tube 70 comprises an inner tubular layer 71 of a separable (heat resistant) material and a concentric outer tubular layer 72 of a polyolefin (heat bondable) material (as shown in FIGS. 2 and 8A); the tube has been collapsed (in the radial direction) to form fold lines F1 and F2 at opposing ends of the collapsed tube. The web 50 comprises: a) in a first area (A1), a two-component stacked construction, including upper and lower multi-layer components 52, 56, that have been laminated together without a collapsed tube layer 70 therebetween; and b) in a second area (A2), bounded axially by fold lines F1 and F2, a three-component stacked construction, including the collapsed coextruded tube 70 (or other folded insert embodiment) aligned in a lengthwise L direction, and laminated between the upper and lower multi-layer components 52, 56. This is best illustrated in FIGS. 2-6, and discussed further below.

The multi-layer liner 10 is punched from both the two component (A1) and three component (A2) areas of the web 50, to form a multi-layer folded insert 80 having a fold line F, the fold line comprising one of the two folded edges F1, F2 of the collapsed tube 70 in the web 50. In this embodiment the folded insert 80 has a substantially circular perimeter P and the fold line F intersects and extends across the circular perimeter P at a length equal to or less than the length of the diameter of the circular tab liner.

The punched liner 10 (of FIG. 1) has a first portion 16 to the right of the fold line F formed from a heat bondable polyolefin layer of area A1 of the web which does not include the collapsed tube. This first area 16 is formed from the multi-layer upper component 52 being directly bonded (thermally laminated) to an adjacent (facing) heat bondable polyolefin layer of the multi-layer lower component 56. A second portion 14 of the liner 10 to the left of the fold line F, is formed from area A2 of the web and includes a folded portion 80 of the collapsed tube 70 thermally laminated (again by facing polyolefin layers) between the upper and lower components 52, 56. The folded portion 80 in the second liner portion 14 forms the hinged pull tab 12, resulting from separation of facing surfaces 81U, 81L of the collapsed separable inner tube layer 71 (as shown in FIGS. 2 and 8A) which are made of a heat resistant polymer and do not bond to each other during either the thermal lamination (to form the web 50) or the subsequent induction heat sealing process (for bonding the liner 10 to the container rim 5).

The punched liner 10 thus includes a portion of the collapsed or folded coextruded tube 70, now referred to as a multi-layer folded insert 80 of the liner 10. In this embodiment, the folded insert 80 is semi-circular in shape, comprising a portion of the folded tube 70 that includes a straight fold line F (same as F1 of web 50) extending across a diameter D of the disk, separating the disk into roughly two equal semi-circular portions, i.e., a non-separable first liner portion 16 to the right of the fold line F, and a second liner area 14 including and to the left of the fold line F, forming the pull tab 12. The second liner portion 16 includes the upper and lower components 52, 56, with the folded insert 80 therebetween. The folded insert includes facing upper and lower semi-circular surfaces 81U, 81L of the heat resistant inner tube layer 71 that are hinged at the fold line F (like a clam shell). The folded insert 80 further includes upper and lower semi-circular surfaces 82U, 82L, of the heat bondable polyolefin outer tube layer 72 thermally laminated to facing heat bondable polyolefin layers of each of the lowermost layer 20 of upper component 52, and uppermost layer 30 of the lower component 56, respectively. The upper 82U/20 and lower 82L/30 composite layers (following thermal lamination) are joined at the fold line F, wherein upper composite layers 82U/20 are movable between a first (closed) position adjacent to the lower composite layers 82L/30, to a second (open) position rotated about the hinge (fold line F) and thus spaced apart from the lower composite so as to form the pull tab 12.

In summary, the separation between the upper 82U/20 and lower 82L/30 composite layers (in liner portion 14) is due to the separable inner layers 81U, 81L of the folded insert 80. In liner portion 16, the upper and lower multi-layer components 20, 30 are thermally laminated together without the folded insert 80, and thus are not separable.

FIGS. 2-6 illustrate one embodiment of a method of making the web 50 and liner 10 of FIG. 1. The layers of the web and liner are shown in cross section for ease of understanding during the various manufacturing steps.

FIG. 2 illustrates three spaced apart, stacked components 52, 70, 56 that are the starting materials 40 for forming the thermally laminated web 50, from which the liner disks 10 will be punched. A multi-layer upper component 52 has an upper layer 53 formed from a reinforcing material, here a bi-axially oriented polyester film, such as polyethylene terephthalate (PET). The lower layer 54 of the upper component comprises a polyolefin material that is thermally bondable to an adjacent polyolefin layer as described below.

The lower multi-layer component 56 has an upper layer 58, also formed from polyolefin material, that will be thermally bonded either to the adjacent lower polyolefin layer 54 of the upper component 52, in a first area A1, or to an adjacent outer polyolefin layer 72L of the collapsed coextruded tube 70 disposed between the upper and lower components 52, 56 in a second area A2. Similarly, the lower polyolefin layer 54 of the upper component 52 will be bonded to an adjacent outer polyolefin layer 72U of the collapsed coextruded tube 70, in the first area A1. The lower component 56 further includes: a lowermost induction heat sealable layer 60, and an inductive heating layer 59 (here aluminum foil) provided between the lower heat sealable layer 60 and the upper polyolefin layer 58.

While the detailed embodiment described herein utilizes a collapsed (folded) tube for making the folded insert, in other embodiments the folded insert is made without a tube, e.g., by folding a multi-layer sheet. Furthermore, there may be one or more other layers in the liner, such as other reinforcing layers (e.g., of PET, nylon or other suitable materials known in the art).

Figure 3:
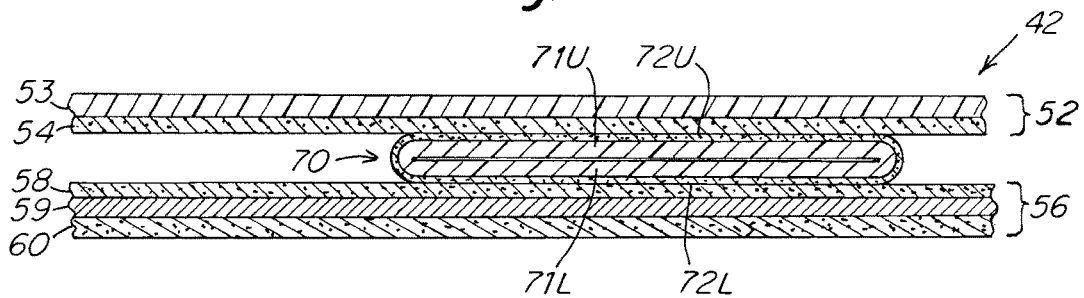
FIG. 3 is cross sectional view showing the three multi-layer components of FIG. 2 brought into contact with one another, prior to thermal lamination.
Figure 4:
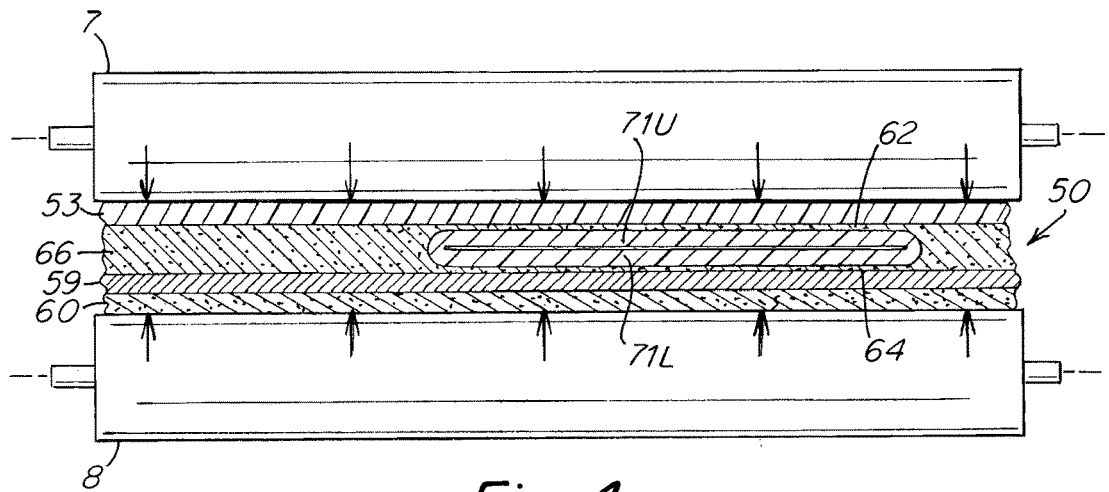
FIG. 4 is a cross sectional view showing the three multilayer components of FIGS. 2-3 being fed between heated rotating rollers for thermally laminating the various multi-layer components into a composite laminated web.
Figure 5:
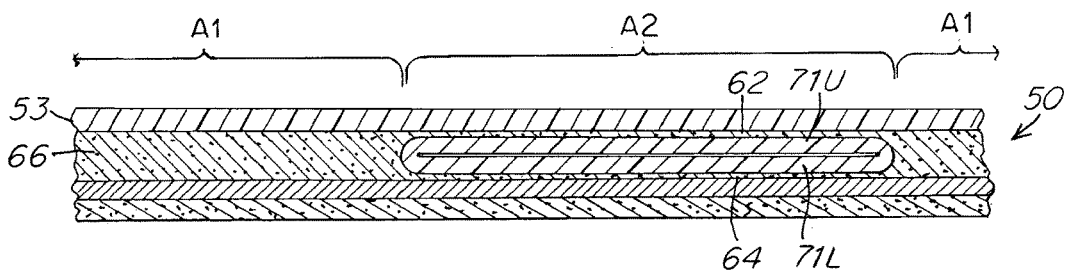
FIG. 5 is a cross sectional view showing the finished laminated web, resulting from the thermal lamination process of FIG. 4.

In FIG. 3, the three spaced apart, stacked components 52, 70, 56 of FIG. 2 have been brought into contact with one another as a stacked composite 42 (the vertical spacing eliminated) in preparation for feeding the stacked composite 42 between opposing pressure rollers 7, 8 (shown in FIG. 4) in order to thermally laminate the three components 52, 70, 56 together to form, in a single thermal laminating step, the laminated web 50 from which multiple liners 10 may be subsequently punched. FIG. 5 shows a portion of the finished thermally laminated web 50, exiting from the rollers 7, 8. In area A2, the originally separate polyolefin layers that are adjacent to one another, namely polyolefin layer 54 of the upper component 52 and polyolefin layer 72U of the coextruded tube strip 70 respectively, have been at least partially melted or softened (during thermal lamination) and now each form a respective single integral polyolefin layer 62, disposed above the inner layer 71U of coextruded tube 70. Also in area A2, separate polyolefin layers 58/72L of the lower component 56 and folded tube 70 respectively are thermally laminated to form a single integral polyolefin layer 64, below inner layer 71L of the tube 70. In the other area A1, the lower polyolefin layer 54 of the upper component 52, and the upper polyolefin layer 58 of the lower component 56, now form a single integral polyolefin layer 66 between the upper and lower components following thermal lamination. As used herein an integral polyolefin layer means a layer whose bond strength is higher than the bond strength of the induction heat sealable layer 60 to the container rim; thus the integral layer can be comprised of one or more polymer materials that are compatible, so long as the bond strength of the integral layer 62, 64, 66 is higher than the bond strength of the induction heat sealable layer 60 to the container rim.

Figure 6:
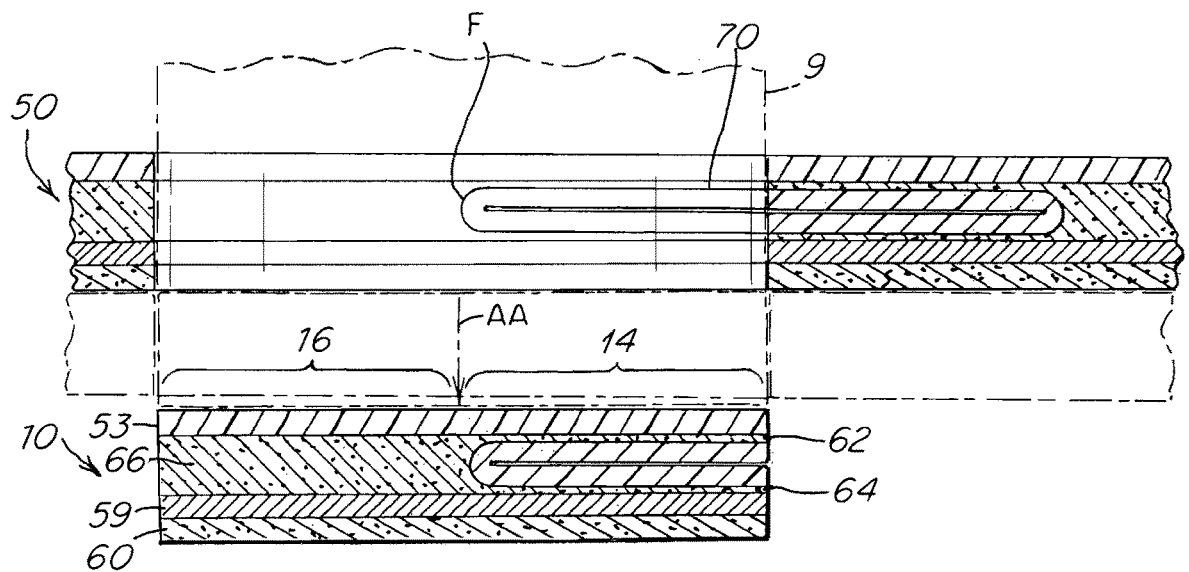
FIG. 6 illustrates a process for punching a liner disk from the laminated web of FIG. 5, such that the resulting liner includes a folded portion of the collapsed coextruded tube (of FIG. 2).

FIG. 6 illustrates a die punching procedure for punching a liner 10 from the web 50. An individual liner 10 is cut as a circular disk by a die punch 9 (in the direction of arrow AA). The punched liner disk includes approximately one semi-circular half of the collapsed coextruded tube 70, including the folded edge F of the collapsed tube, in order to form the liner portion 14, and the other liner portion 16 without the insert. In both liner portions 14, 16, the previously adjacent polyolefin layers now form a single integral polyolefin layer 62/66/64 (across a portion of the liner disk) that provides a simplified construction, a strong bond that resists delamination, and a reduced number of assembly steps. In other embodiments, the punched liner does not have to include equal portions of 16 and 14, i.e. the liner can be punched off center with respect to the fold line in order to produce unequal portions 16 and 14, creating a smaller or larger tab portion.

Figure 7:
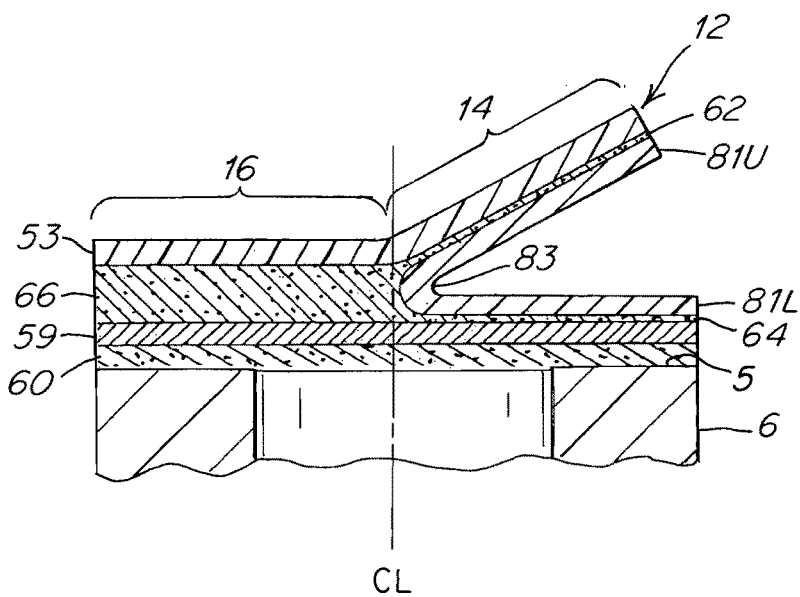
FIG. 7 is a cross sectional view showing the punched liner of FIG. 6 attached to the rim of a container by induction heat sealing; a separable inner layer of the collapsed coextruded tube (of FIG. 2) is made of a heat resistant polymeric material that resists bonding during both the thermal lamination and the induction heat sealing processes to produce a pull tab in a second liner area, while in a first liner area, without the folded insert, the upper and lower multilayer components are thermally laminated with no separation (non-separable).

FIG. 7 shows the punched liner of FIG. 6, with its lowermost heat sealable layer 60 now bonded (induction heat sealed) to the rim 5 of a container 6. FIG. 7 also shows the movable tab 12 in an open position for ease of grasping by a user. In this embodiment, the inner separable layer 71 of the collapsed coextruded tube 70 (see FIGS. 2 and 8A), which forms the facing separable layers 81U, 81L of the liner, is formed of a polyester material that resists the heat and pressure of the thermal lamination step so as to remain separable and form the tab 12. The separable inner tube layer may comprise any of various known materials, for example, a polyester such as polyethylene terephthalate, polyethylene naphthalate (PEN), or a polyamide such as nylon 6, or nylon 66. The outer layer 72 of the collapsed coextruded tube 70, is made of a polyolefin material which, during the thermal lamination process, bonds with the adjacent polyolefin layers 54, 58 of the upper and lower multilayer components 52, 56 respectively to form integral polymer layers 62 and 64 respectively (see FIG. 2) in the finished liner. Preferably, as shown in the embodiment of FIGS. 1-7, the first 14 and second 16 liner portions are disposed adjacent either side of a common center line CL of the liner and container neck 6, wherein the folded polymer insert 80 has a single fold line 83 disposed at or adjacent the center line CL. In other embodiments the fold line 83 is not disposed at the CL of the neck finish.

FIGS. 8-10 show three alternative embodiments for making a multilayer folded insert 80. FIGS. 8A-8B illustrate the collapsed coextruded tube embodiment of FIGS. 1-7, wherein a two-layer coextruded circular cylindrical tube 70 includes an outer heat bondable polyolefin layer 72 and an inner heat resistant PET layer 71. In FIG. 8B, the collapsed tube 70 has fold lines F1, F2 at opposing edges. The collapsed tube has adjacent inner layers 71U, 71L, and opposed outer layers 72U and 72L. In various embodiments there may be tie layers between the various layers, or other additional layers.

FIGS. 9A-9B show an alternative (non-tube) embodiment wherein a multilayer (e.g., coextruded or laminated) sheet 120 includes an outer polyolefin layer 122 and an inner heat resistant (e.g., PET) layer 121. The multilayer sheet is folded in the thickness direction at fold line F1, to form a folded sheet portion including facing interior layers 121U, 121L, and opposing outer layers 122U, 122L.

FIGS. 10A-10B show another embodiment in which a multi-layer sheet 130 is folded inwardly on itself from two opposing edges 135, 136, to form two fold lines F1, F2, one at each end of the double folded strip 130. The opposing edges 135, 136 of the strip are pulled toward one another until they are approximately adjacent, thus creating two essentially equal folded inserts 80A, 80B, one on either half of the double folded strip 130. Again, this double folded strip can be laid longitudinally (direction L) in a web as illustrated in FIG. 1, from which two individual liner disks may be punched, each including one of the opposite folded portions 80A, 80B of the strip.

Figure 11:
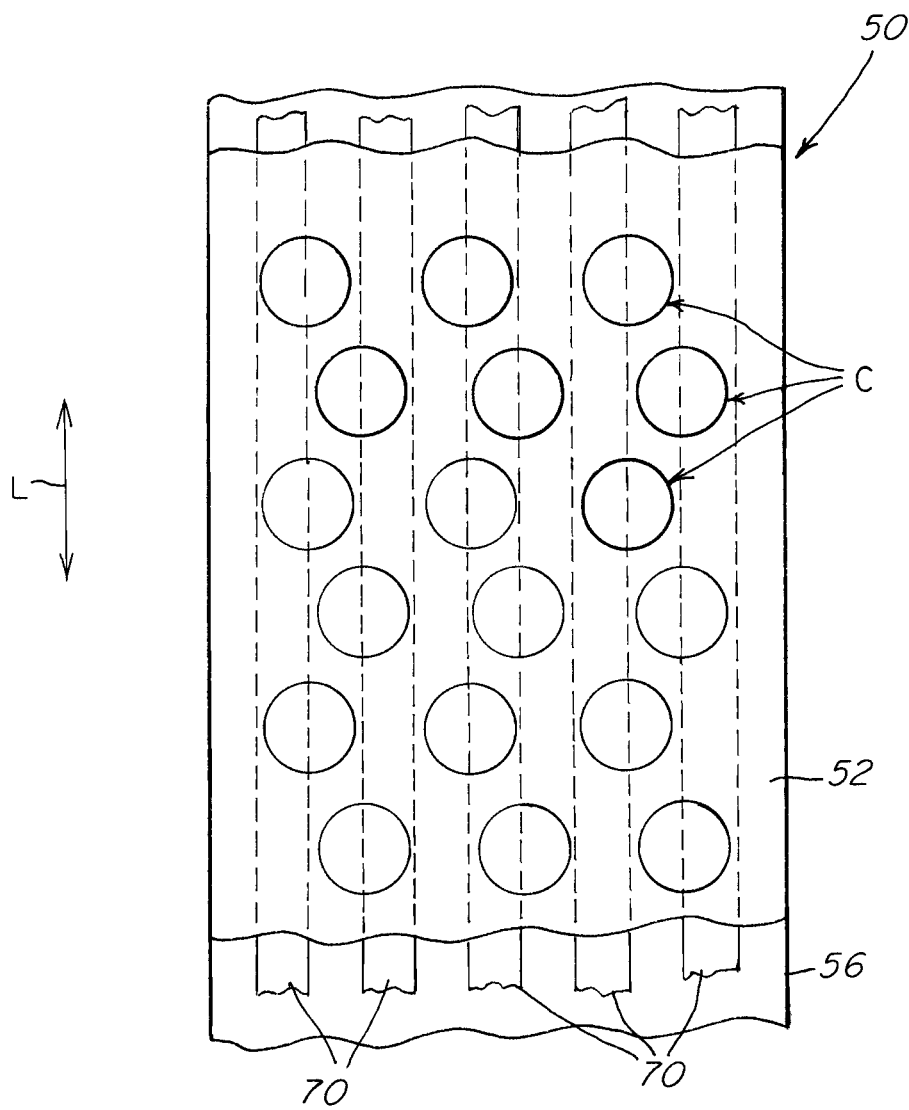
FIG. 11 is a top plan, partial cut away view of a thermally laminated web according to one embodiment, in which strips of a multi-layer folded insert, such as the collapsed coextruded tube of FIGS. 1-7, are laid down in spaced apart locations parallel to the longitudinal (length) direction of the web, and showing the locations (the circles in FIG. 11) of multiple liner disks to be punched from the web, each disk straddling a portion of the fold line of the collapsed coextruded tube so as to form a folded insert in the punched liner.

FIG. 11 illustrates a section of a web 50 (as in FIG. 1) wherein multiple elongated collapsed tube strips 70 (or folded inserts) are spaced apart across the width of the web, each aligned in the longitudinal direction (L), between upper and lower sheet components 52, 56 as previously described. The plurality of circles C illustrate locations at which individual disks 10 can be punched from the web so as to include a first liner portion 14 having a folded insert (e.g., a portion of the collapsed tube 70) located between the upper and lower components, and a second liner portion 16 wherein there is no folded insert between the upper and lower components.

FIGS. 12-15 illustrate alternative multi-layer constructions of the lower component. The layers of the various structures may be formed by coextusion, extrusion coating, extrusion lamination, or dry bond lamination.

Figure 12:
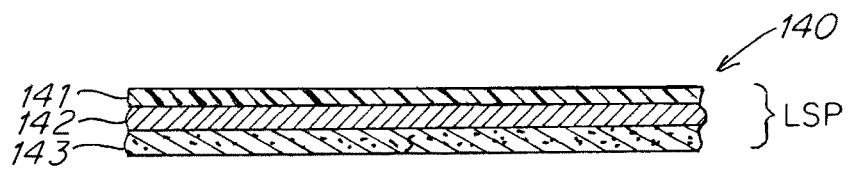
FIGS. 12-15 are cross sectional views showing alternative embodiments of the lower multi-layer component.

FIG. 12 shows one embodiment of a lower component 140 including, in serial order from top to bottom: an upper layer 141 of solid (non-foam) polyolefin, such as EVA or LDPE (low density polyethylene); a middle layer 142 of aluminum foil; and a lower heat sealing layer 143. This is the embodiment shown in FIGS. 1-7.

Figure 13:
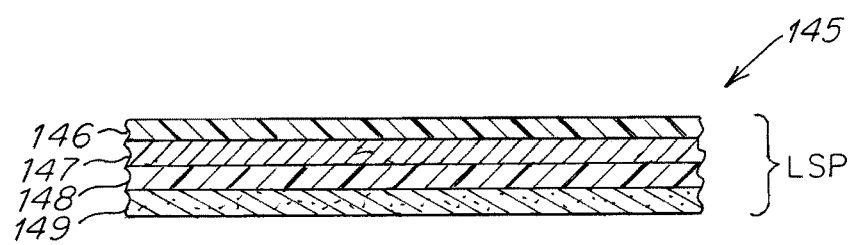

FIG. 13 shows an alternative four layer embodiment of the lower component 145 including, in serial order from top to bottom: an upper polyolefin layer 146, an aluminum foil layer 147, a PET layer 148, and lower heat sealing layer 149.

Figure 14:
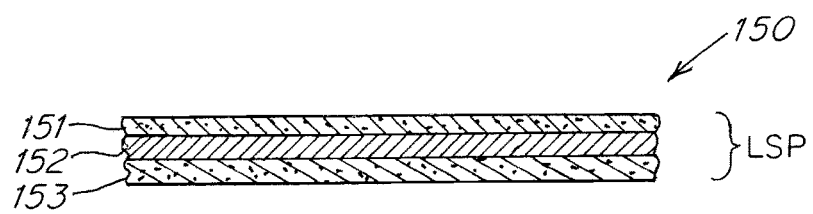

FIG. 14 illustrates a further alternative, in which the lower component 150 includes, in serial order from top to bottom: an upper polyolefin foam layer 151, an aluminum foil layer 152; and a lower heat sealing layer 153.

Figure 15:
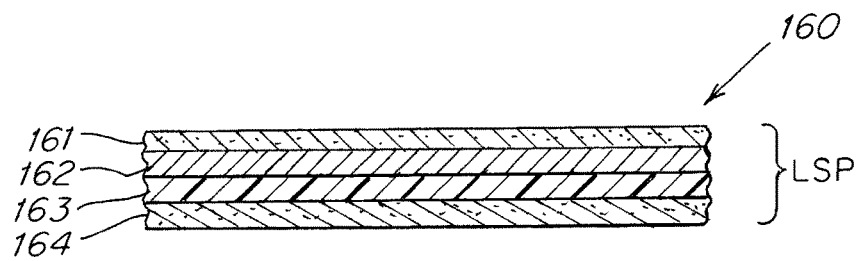

FIG. 15 shows a further alternative, in which the lower component 160 includes, in serial order from top to bottom: a polyolefin foam upper layer 161; an aluminum foil layer 162; a PET layer 163; and a lower heat sealing layer 164.

These and other embodiments of the invention will be apparent to the skilled person.

The invention claimed is:

1. A liner comprising:
three stacked multilayer components thermally laminated together to form a composite liner, the liner having an induction heat sealable lower layer for sealing to a rim of a container and a pull tab for ease of removal of the liner from the rim of the container, the three multilayer components comprising:
an upper multilayer component (UMC) comprising an upper support layer and a lower heat bondable polyolefin layer; and
a lower multilayer component (LMC) comprising an upper heat bondable polyolefin layer, the lower induction heat sealable layer, and an inductive heating layer there between;
a folded insert comprising upper and lower multilayer insert portions joined at a fold line, each insert portion comprising an outer heat bondable polyolefin layer and an inner heat resistant separable layer wherein in a folded position the inner separable layers of the insert portions are facing one another and resist bonding by thermal lamination and induction heating to form the pull tab in the liner,
the liner being formed by a method comprising:
in a first area of the liner the UMC and LMC polyolefin layers are disposed facing one another and are thermally laminated by application of heat and pressure to form an integral polyolefin layer of a non-separable first liner portion; and
in a second area of the liner the polyolefin layers of the upper and lower insert portions are disposed facing the UMC and LMC polyolefin layers respectively and thermally laminated, by application of heat and pressure, to form integral polyolefin layers in a second liner portion having the pull tab
wherein the polyolefin layers of the liner are thermally laminated by at least partially melting the adjacent polyolefin layers to form the respective integral polyolefin layers in the first and second areas.

2. The liner of claim 1 wherein the folded insert is formed from a multilayer tube or sheet comprising the heat bondable polyolefin layer and the heat resistant separable layer, the folded insert formed by a method comprising:
radially collapsing the tube or folding the sheet to form the fold line and insert portions on opposite sides of the fold line.

3. The liner of claim 1, wherein the liner has a substantially circular perimeter and the fold line intersects and extends across the circular perimeter at a length equal to or less than a diameter of the circular perimeter.

4. The liner of claim 1, wherein the support layer is formed from one or more of polyethylene terephthalate, polyamide, polyethylene naphthalate, polypropylene, or any combination thereof.

5. The liner of claim 1, wherein the folded insert is formed from a multilayer tube, the tube having an outer tube layer comprising the outer polyolefin layer of the insert, and the tube having an inner layer comprising the separable layer of the insert, the tube being collapsed to form the fold line and cut to form a folded tube portion that comprises the folded insert.

6. The liner of claim 1, wherein the liner is punched from a thermally laminated web of the three multilayer components.

7. The liner of claim 1, wherein the polyolefin layers of the liner are formed from at least one of ethylene vinyl acetate (EVA) based polymers, ethylene-methyl acrylate (EMA) based polymers, and ethylene-ethyl acrylate (EEA) based polymers.

8. The liner of claim 1, wherein the polyolefin layers of the liner comprise polypropylene, polyethylene, and copolymers and blends thereof.

9. The liner of claim 1, wherein the inductive heating layer comprises a metal foil layer.

10. The liner of claim 1, wherein the multilayer components are formed by one or more of extrusion, coextrusion, extrusion coating, extrusion lamination, and dry bond lamination.

11. The liner of claim 1, wherein the polyolefin layers of the liner are formed from at least one of an ethylene-based polymer and a propylene-based polymer.

12. The liner of claim 11, wherein the ethylene-based polymer is an ethylene-alpha olefin copolymer and the propylene-based polymer is a propylene-alpha olefin copolymer.

* * * * *